(12) United States Patent
Mueller et al.

(10) Patent No.: US 8,885,478 B2
(45) Date of Patent: Nov. 11, 2014

(54) SYSTEM AND METHOD FOR TRANSFERRING DATA PACKETS THROUGH A COMMUNICATION SYSTEM

(75) Inventors: Rainer P. Mueller, Austin, TX (US); Horace C. Ho, Austin, TX (US); Patrick Heck, Durmersheim (DE); David Knapp, Austin, TX (US); Kevin Rolfes, Austin, TX (US)

(73) Assignee: SMSC Europe GmbH (DE)

( * ) Notice: Subject to any disclaimer, the term of this patent is extended or adjusted under 35 U.S.C. 154(b) by 66 days.

(21) Appl. No.: 12/193,328

(22) Filed: Aug. 18, 2008

(65) Prior Publication Data

US 2009/0080462 A1   Mar. 26, 2009

Related U.S. Application Data

(63) Continuation of application No. PCT/EP2007/001367, filed on Feb. 16, 2007.

(30) Foreign Application Priority Data

Feb. 17, 2006   (EP) .................................... 06003322

(51) Int. Cl.
| | | |
|---|---|---|
| H04L 12/26 | (2006.01) | |
| H04L 12/54 | (2013.01) | |
| H04J 3/00 | (2006.01) | |
| H04L 12/835 | (2013.01) | |
| H04L 12/801 | (2013.01) | |
| H04L 12/825 | (2013.01) | |

(52) U.S. Cl.
CPC ............... H04L 47/10 (2013.01); H04L 47/30 (2013.01); Y02B 60/31 (2013.01); H04L 47/266 (2013.01); H04L 47/263 (2013.01); H04L 47/18 (2013.01)

USPC .......................... 370/236; 370/429; 370/476

(58) Field of Classification Search
None
See application file for complete search history.

(56) References Cited

U.S. PATENT DOCUMENTS

| 4,078,228 A | 3/1978 | Miyazaki |
|---|---|---|
| 4,553,268 A | 11/1985 | Tilly |

(Continued)

FOREIGN PATENT DOCUMENTS

| EP | 0580083 | 1/1994 |
|---|---|---|
| EP | 1109336 | 6/2001 |

(Continued)

OTHER PUBLICATIONS

Tanenbaum, "Computer Networks," Pearson Education 2003, pp. 333-336.

(Continued)

*Primary Examiner* — Jutai Kao
(74) *Attorney, Agent, or Firm* — Kevin L. Daffer; Daffer McDaniel LLP (57) ABSTRACT

A communication system, network, interface, and port architecture are provided for transporting data across a network. The network can be arranged by connecting the ports in a daisy chain fashion to achieve a ring architecture or topology. The network forwards data according to a specific network protocol. A first port forwards frames having a preemptive acknowledge field before the payload. A second port receives these frames, stores them in a frame buffer and modifies the preemptive acknowledge field according to its available frame buffer capacity. Said first port controls its data flow according to the modified preemptive acknowledge field.

24 Claims, 6 Drawing Sheets

(56) References Cited

U.S. PATENT DOCUMENTS

| | | | |
|---|---|---|---|
| 4,622,550 A * | 11/1986 | O'Connor et al. | 370/452 |
| 6,170,022 B1 | 1/2001 | Linville et al. | |
| 6,611,537 B1 | 8/2003 | Edens et al. | |
| 6,865,188 B1 | 3/2005 | Stirling et al. | |
| 7,319,669 B1 * | 1/2008 | Kunz et al. | 370/235 |
| 7,639,608 B1 * | 12/2009 | Jain et al. | 370/229 |
| 2002/0150049 A1 | 10/2002 | Collier et al. | |
| 2003/0076569 A1 | 4/2003 | Stevens | |
| 2003/0156542 A1 | 8/2003 | Connor | |
| 2005/0174941 A1 | 8/2005 | Shanley et al. | |
| 2005/0213270 A1 | 9/2005 | Shimizu | |
| 2005/0281288 A1 * | 12/2005 | Banerjee et al. | 370/477 |
| 2005/0286516 A1 * | 12/2005 | Sundaresan et al. | 370/389 |
| 2006/0164985 A1 * | 7/2006 | Semper | 370/230 |
| 2006/0215544 A1 * | 9/2006 | Asa et al. | 370/216 |
| 2007/0008884 A1 * | 1/2007 | Tang | 370/230 |

FOREIGN PATENT DOCUMENTS

| | | |
|---|---|---|
| EP | 1603284 | 12/2005 |
| GB | 2325124 | 11/1998 |
| JP | 6-276206 | 9/1994 |
| JP | 2004-282470 | 10/2004 |
| WO | 00/10270 | 2/2000 |
| WO | 2004/004181 | 1/2004 |

OTHER PUBLICATIONS

Stallings, "Handbook of Computer Communications—LAN," Dec. 2003, pp. 160-161.

MacLeod, "Gigabit Ethernet Full-Duplex Repeaters," Annual Review of Communications, vol. 50, 1997, pp. 509-509.

International Search Report, PCT/EP2007/001367, mailed Jul. 9, 2007.

Shimizu, "The real state of IBM Token-Ring," Nikkei Byte, vol. 22, Jul. 1986, pp. 137-151.

Aiso, "Digital communication series: Local area network," Sangyoutosho Kabushikigaisha, vol. 1, Nov. 1988, pp. 19-25.

Office Action mailed Sep. 20, 2011 for corresponding Japanese Patent Application No. 2008-554688.

European Search Report for EP 12162658.4 mailed Jun. 19, 2012.

Office Action mailed Apr. 1, 2014 for EP Application No. 07757129.7.

Search Report mailed Apr. 2, 2014 for EP Application No. 12168262.9.

* cited by examiner

| Field | Size (bytes) |
|---|---|
| Start | 1 |
| Destination | 6 |
| Pre-emptive ACK (PACK) | 1 |
| Length | 2 |
| Data | 38 to 1500 |
| CRC | 4 |
| End | 1 |

Fig. 4

| Field | Size (bytes) |
|---|---|
| Start | 1 |
| Destination | 6 |
| Source | 6 |
| Length | 2 |
| Data | 38 to 1500 |
| CRC | 4 |
| End | 1 |

SYSTEM AND METHOD FOR TRANSFERRING DATA PACKETS THROUGH A COMMUNICATION SYSTEM

CROSS-REFERENCE TO RELATED APPLICATIONS

This application is a continuation of pending International Application No. PCT/EP2007/001367 filed Feb. 16, 2007, which designates the United States and claims priority to European Application No. 06003322.2 filed Feb. 17, 2006.

BACKGROUND OF THE INVENTION

1. Field of the Invention

The invention relates to a communication system, ports of the communication system and a method for managing a communication system, preferably to a synchronous communication system formed as a ring network of two or more ports coupled in daisy chain fashion to one another to allow communication.

2. Description of the Related Art

The following descriptions and examples are not admitted to be prior art by virtue of their inclusion within this section.

A communication system is generally known as a system that permits communication between nodes interconnected by a transmission line. Each node can transmit information and receive information across the transmission line. The communication system of interconnected nodes can be organized in various topologies, such as bus, ring, star, or tree topology or a combination thereof.

A bus topology network is generally regarded as linear. Transmissions from one node propagate along the transmission line and are received by all other nodes connected to that bus. A ring topology network, however, generally consists of a series of nodes connected to one another by unidirectional transmission links to form a single, closed loop. Examples of a ring network are described in IEEE 802.5 and Fiber Distributed Data Interface (FDDI).

The transmission line between nodes can be either wired or wireless, for example, copper wire, fiber optic, or wireless transmission medium for the chosen transmission line, respectively.

A communication system, for real-time applications or for transferring synchronous streaming data must have a low latency and a low transmission overhead.

Ethernet and IEEE 802.03 specify a particular protocol in which packets of data can be sent between computing systems. Ethernet can sense multiple access collisions and can arbitrate which source device will gain mastership over the transmission line. Ethernet operates at the lowest levels of the OSI reference model, normally reserved for the data link and physical link layers. The Ethernet protocol specifies a particular frame format of a preamble, followed by a destination address and a source address and then the data payload. The data is generally encoded in a 4B/5B or 8B/10B encoding structure prior to the data being sent across a coax or twisted pair transmission lines. On detection of a collision, a jam signal is transmitted to inform other nodes that a collision has occurred. A hub or a repeater will forward the jam signal on all ports, thereby informing all other nodes about the collision and forcing them to wait until the next transmission. The purpose of this jam signal is to extend a collision significantly, so that all other nodes on the network cease transmitting. Jamming is also used when dealing with congestion. It is an attempt to eliminate frame loss within a node by applying "back pressure" to other nodes consuming the node's buffer capacity. One way of accomplishing this is for a node to issue an Ethernet jam signal when buffers fill beyond a threshold level. Using the Ethernet jam signal makes a network rather indeterministic, as the forced delay for re-transmission is a minimum fixed delay permitting all other nodes to cease transmission plus a certain random delay time. Furthermore a single slow node can slow down the whole network.

BRIEF SUMMARY OF THE INVENTION

The following description of various embodiments of communication ports, nodes, systems, and methods for reducing latency and overhead in communication systems is not to be construed in any way as limiting the subject matter of the appended claims.

Exemplary embodiments of communication ports, nodes, and communication systems include a framer which is configured to generate frames having at least a destination address field to identify a receiving port and a preemptive acknowledge field which is configured for encoding by the receiving port.

Other exemplary embodiments of communication ports, nodes, and communication systems include a frame buffer for storing frames and an encoder for encoding information in a preemptive acknowledge field of a frame received from another communication port about the status of the frame buffer.

An exemplary embodiment of a method for communication between ports in a communication system includes generating in a first port a frame having at least a destination address field to identify one or more receiving ports and a preemptive acknowledge field which is configured for encoding by the one or more receiving ports. The method further includes transmitting the frame via a transmission line to the one or more receiving ports, evaluating in succession at ports along the transmission line the destination address field, determining whether the frame is to be received at the respective ports, and evaluating space availability of a frame buffer associated with a receiving port.

BRIEF DESCRIPTION OF THE DRAWINGS

In the following, the invention will be described by way of example, without limitation of the general inventive concept, on examples of embodiments with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

A first communication port is provided which is configured to generate frames comprising at least a start identifier for marking the beginning of a frame, a destination address field to identify the receiver of the frame, a preemptive acknowledge field, and a data field.

Furthermore, a second communication port is configured for encoding information about its buffer status in the preemptive acknowledge field of the frame generated by the first communication port.

In a further embodiment, the first communication port is further configured for receiving and decoding said preemptive acknowledge field being modified by a second communication port and further proceeding with or ceasing sending the rest of the frame in dependency of the buffer status as previously encoded by the second communication port in the preemptive acknowledge field.

For synchronization of the data stream, a preamble may be sent prior to the start identifier. The start identifier itself may comprise one start byte according to be Ethernet standard, but any other size may be appropriate.

The destination address field comprises a unique address for identifying the receiver of the frame. Alternatively, the address field may contain a plurality of addresses, a multicast or a broadcast address. The destination address field may have a length of 6 bytes according to the Ethernet standard.

The preemptive acknowledge field is used to give arbitrary information about the receiver buffer to the transmitter. It may comprise only a single bit, but alternatively it may comprise one byte or any number of bits. The preemptive acknowledge field is also referred as PACK field. Its function will be explained in detail below.

The data field is commonly referred to as the payload of the frame, whereas the preceding fields, i.e. start identifier, destination address and the preemptive acknowledge byte are referred to as the header. The data field may have a fixed or a variable length. There may also be a length identifier in the header. In the Ethernet standard, such an identifier is implemented having two bytes in length and specifying the length of the data field in bytes. Furthermore, according to the Ethernet standard, the data field may have a size from 38 to 1500 bytes. Of course, any other size may be chosen if appropriate. Optionally, there may be a plurality of data fields.

The data field may be succeeded by a trailer, which may be a checksum, for example, of 4 bytes in the Ethernet standard.

In many cases, it is advantageous to include a data field in the frame, but the architectures and methods described herein are not necessarily so limited. In particular, it is contemplated that a frame may not need a data field when it is used for signaling purposes. Of course, there may be additional fields in the frame.

The preemptive acknowledge is not a separate message, instead it is part of each data frame. It is placed prior to the data field to allow any receiving port to take an action before the data field is transmitted or received. To make a frame fully compatible with the Ethernet standard, it is not possible to insert an additional preventive acknowledge field. Instead other fields may be used. Such a field must be located after the destination address and before the payload or at least at the beginning of the payload. For example the data field length identifier may be used. It could be set to a non-a defined value, giving a not allowed data field size, if the second port cannot accept any more data. As an alternative, one or more bytes at the beginning of the data field may be used. To this end, the frame could be extended for one or more additional bytes.

These frames are assembled by the port. A separate framer may be included in the port. Subsequently to the assembly of the frame, by e.g. a framer, the frame is transmitted by the first port via a transmission line. A second communication port receives data from the communication line. This communication port has a frame buffer for storing frames and a decoder for disassembling the frames or at least parts thereof. When receiving data, the second port may first synchronize on a preamble, if available. Then, the second port receives a start byte following the preamble. Next, it receives the destination address. After evaluating the destination address, the second port can now determine whether the frame has to be received or not. When the frame has to be received, the second port has to check for available buffer space. If there is enough buffer space, it signals that it can receive the frame by sending a predetermined pattern in the preemptive acknowledge field.

If the frame size can vary largely, the preemptive acknowledge field may be preceded by a size identifier, which preferably identifies the size of the data field or of the whole frame. This simplifies determining whether the second port has enough buffer space.

In preferred embodiments, when the first port and the second port are in the same collision domain. This is the case when, for example, first and second ports share the same transmission line. The ports may as well be connected to a ring network. The major difference between a ring network and a shared transmission line is that in a ring network each node forwards a received frame to the next node in the ring, whereas in the case of a shared transmission line no forwarding is necessary, as all nodes have access to the same data on the same line. In general, the first and second ports should be connected in such a way that the second port may modify a frame sent by the first port and this modified frame can be received by the first port again. This is usually not the case in switched networks and in wide area networks. Especially in the latter case, received frames are not forwarded to the sender again.

In preferred embodiments, the second port is adapted to modify the frame from the first port. This can be done in various ways. In a network like the Ethernet having a common collision domain of several ports, the frame may be modified by a second port device bitwise, e.g. bit by bit. This is different to jamming, which is unselective and simply makes the frame invalid. A predetermined bit pattern is put on the network to inform the first port about the status of a second port's buffer. The status can be for example buffer full, buffer empty or the size of available buffer space.

In the case of a bus where each node is connected only to a switch or router, each node may forward received frames to another node, which may be the sender of the frame.

In the case of a ring bus, each node must forward received frames to permit communication to neighbor nodes. This is at least the case in broadcast or multicast frames, which must be sent to several nodes. In these cases, the forwarded frame may simply be modified by exchanging bits in the preemptive acknowledge field.

In further embodiments, the second port may be adapted for generating a new frame having a modified preemptive acknowledge field. The new frame may either have the specified minimum frame size or it may even be terminated immediately after the preemptive acknowledge field. This works in most networks, except in a ring bus, as there the received data often has to be forwarded to a neighbor node.

In further embodiments, the second port is adapted to modify the preemptive acknowledge field in the frame only when its frame buffer can store a full frame.

In other embodiments, the second port does not alter the preemptive acknowledge field if the frame buffer is full or if it has at least reached a certain limit.

Alternatively, the second port may be modified such that it signals an overrun of the receive buffer by modifying the preemptive acknowledge field in a different way as signaling an empty receive buffer. Furthermore, it may signal the size of the receive buffer, for example by returning the number of available bytes.

In other embodiments, the second port may be configured to signal a delay time in the preemptive acknowledge field. Preferably, this delay time signals an estimated time the second port will require to free the receive buffer.

In other embodiments, the first port is adapted for checking the preemptive acknowledge field for modifications by the second port. Therefore, it may compare the received preemptive acknowledge field with the origin of the transmitted value or with a list or table of allowed values.

In further embodiments, the first port is adapted for transmitting of further frames only for the case that the preemptive acknowledge field signals that the second port frame buffer can store at least a full frame.

In other embodiments, the first port is adapted to delay further frame transmissions for a specified time. An instruction to delay further transmissions may be encoded by the preemptive acknowledge field. The preemptive acknowledge field may contain a delay time, which may be calculated by the second port, such that the buffer is expected to be emptied after this delay time. In other embodiments, the delay time may be a random time, being calculated by the first port or by the second port. This prevents sending more and more frames to the second port, causing a buffer overrun.

In further embodiments, the first port is adapted for reducing the frame rate in case the preemptive acknowledge field has not been modified. By this way, it is attempted to communicate with non-responding devices.

Further embodiments comprise a first port being adapted for entering a sequence to handle an exception for a second port being not responsive. This sequence is entered when the preemptive acknowledge field has not been modified. For the case when the second port is responsive, it will modify the preemptive acknowledge field by either signaling a full or an empty frame buffer.

Other embodiments comprise a first port being configured for transmitting a frame having the size of the available buffer space of the second port.

A communication system is provided which includes at least a pair of communication ports as described above. Preferably, there are a higher number of communication ports.

A bus node is provided which includes at least a communication port with the features of the first communication port and/or the second communication port.

A method for managing a frame buffer overrun in a communication system comprises the following steps: (a) generating frames having at least a start identifier, a destination address field, a preemptive acknowledge field, and a data field, wherein the preemptive acknowledge field is placed in front of the data field; and (b) evaluating the destination address field and determining whether a frame has to be received and stored in a frame buffer. If the frame has to be stored, the available frame buffer space is checked and compared to the frame size. The preemptive acknowledge field is then modified according to the available space in the frame buffer.

A major advantage of the ports, systems, and methods described herein is that the second port can check for a buffer overflow during the transmission of a frame check and accordingly signal this to the first port sending the frame. When the second port receives a frame, it can evaluate the address field and check whether it has to receive and to store the frame into a frame buffer. It then can check for available buffer space. If the buffer space is not sufficient for a frame, it can immediately signal this information about the second port's buffer status to the first port by modifying the preemptive acknowledge field. The frame is again received by the first port, evaluating the preemptive acknowledge field. If a buffer overflow (overrun) is signaled, it can stop transmitting further data of the frame immediately. Therefore, in most cases the preemptive acknowledge field may be the last field of frame, as the transmission of the frame is aborted. This frees the communication system and the transmission line immediately and makes it available for other communication and other frames. Therefore, the inventive ports and communication system results in a low latency of the bus system in case of buffer overflow of a receiving port.

Figure 1:
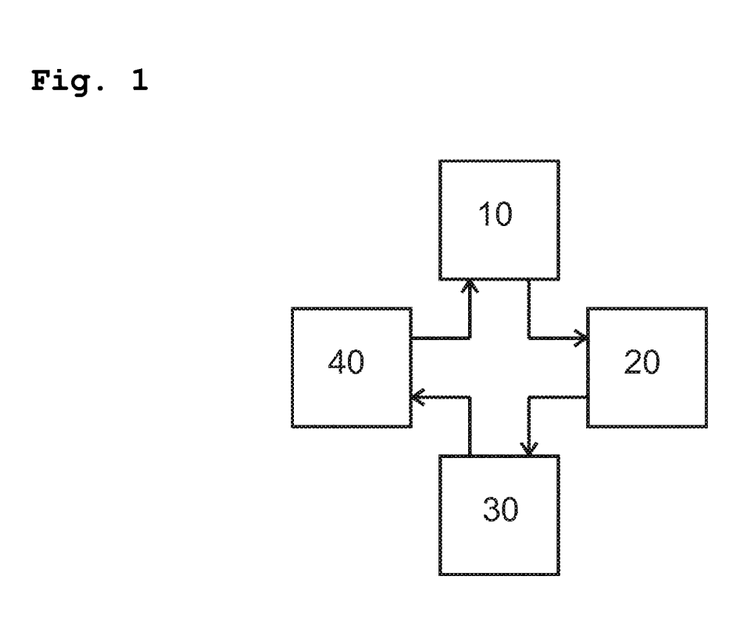
FIG. 1 shows four nodes connected to a ring bus.
Figure 2:
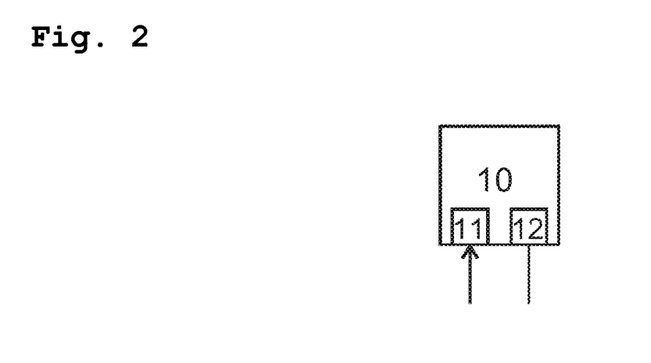
FIG. 2 shows a single network node more detailed.

In FIG. 1, a simple ring bus comprising four nodes 10, 20, 30, 40 is shown. Each node has a port with an input and an output as shown in FIG. 2. The transmitting port of each node is connected to the receiving port of the next node, therefore resulting in a closed loop. If node 10 will send a frame to node 30, it transmits each bit of the frame, one after one, on its port 12 to node 20. This node receives the bits by its port, checks the address field, determines that this node is not addressed and forwards the bits by its transmit port to node 30. Node 30 receives the bits by its port. After checking the address field, it knows that it is the receiver of that frame. Therefore, it checks its frame buffer for free space to buffer a frame. If there is enough buffer space, the PACK field of the frame is set to a first value and the incoming bits are stored in the frame buffer. If there is not enough buffer space, the PACK field of the frame is set to a second value and the incoming bits are discarded. The bits of the frame with the modified PACK field are then forwarded by the transmit port to node 40. This node receives the bits by its port, checks the address field, determines that this node is not addressed and forwards the bits by its port to node 10. This node receives all the bits with its port and may compare the received bit sequence with the transmitted sequence. When it recognizes changed bits in the PACK field of the frame, signaling that node 30 cannot buffer the frame, it immediately stops transmitting the rest of the frame and frees the bus. For the case when PACK bits have not been modified at all, node 10 may assume that node 30 is not available at all and it may also stop transmission.

In FIG. 2, a more detailed view of a network node is given. The network node 10 has an input 11 for receiving signals from other nodes and an output 12 for transmitting signals to other nodes.

Figure 3:
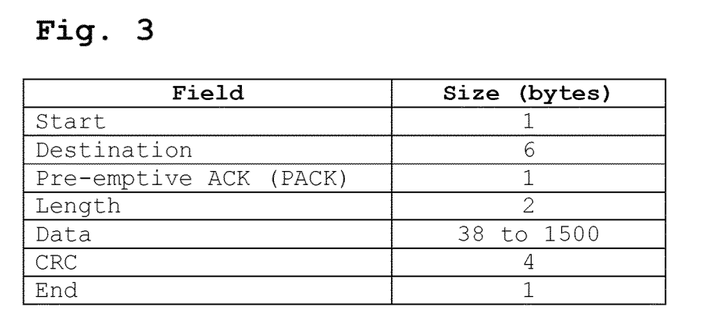
FIG. 3 shows an exemplary frame according to the invention.

In FIG. 3, an exemplary frame according to the invention is shown. This frame comprises the fields:
Start: start byte,
Destination: destination address
Preemptive ACK (PACK): preemptive acknowledge
Length: number of bytes in the data field
Data: data field (payload)
CRC: checksum for the frame or the data field
End: end byte
The right column of the table specifies the number of bytes in the field. Compared to the standard Ethernet frame in FIG. 4, there is an additional preemptive acknowledge field. Optionally, there may be included a source address field identifying the source of the frame after the destination address field.

Figure 4:
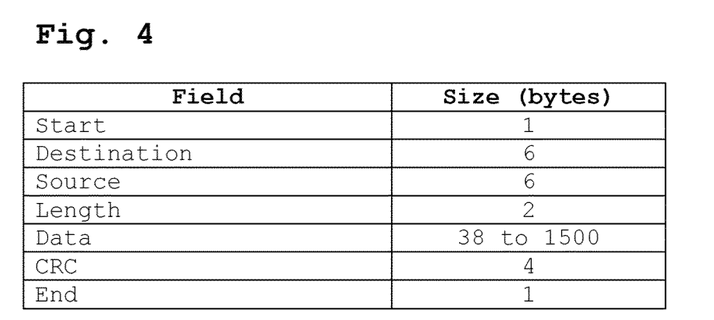
FIG. 4 shows a standard Ethernet frame.

In FIG. 4, an Ethernet frame is shown. This frame comprises the fields:
Start: start byte,
Destination: destination address
Source: source address
Length: number of bytes in the data field
Data: data field (payload)
CRC: checksum for the frame or the data field
End: end byte
The right column of the table specifies the number of bytes in the field.

Figure 5:
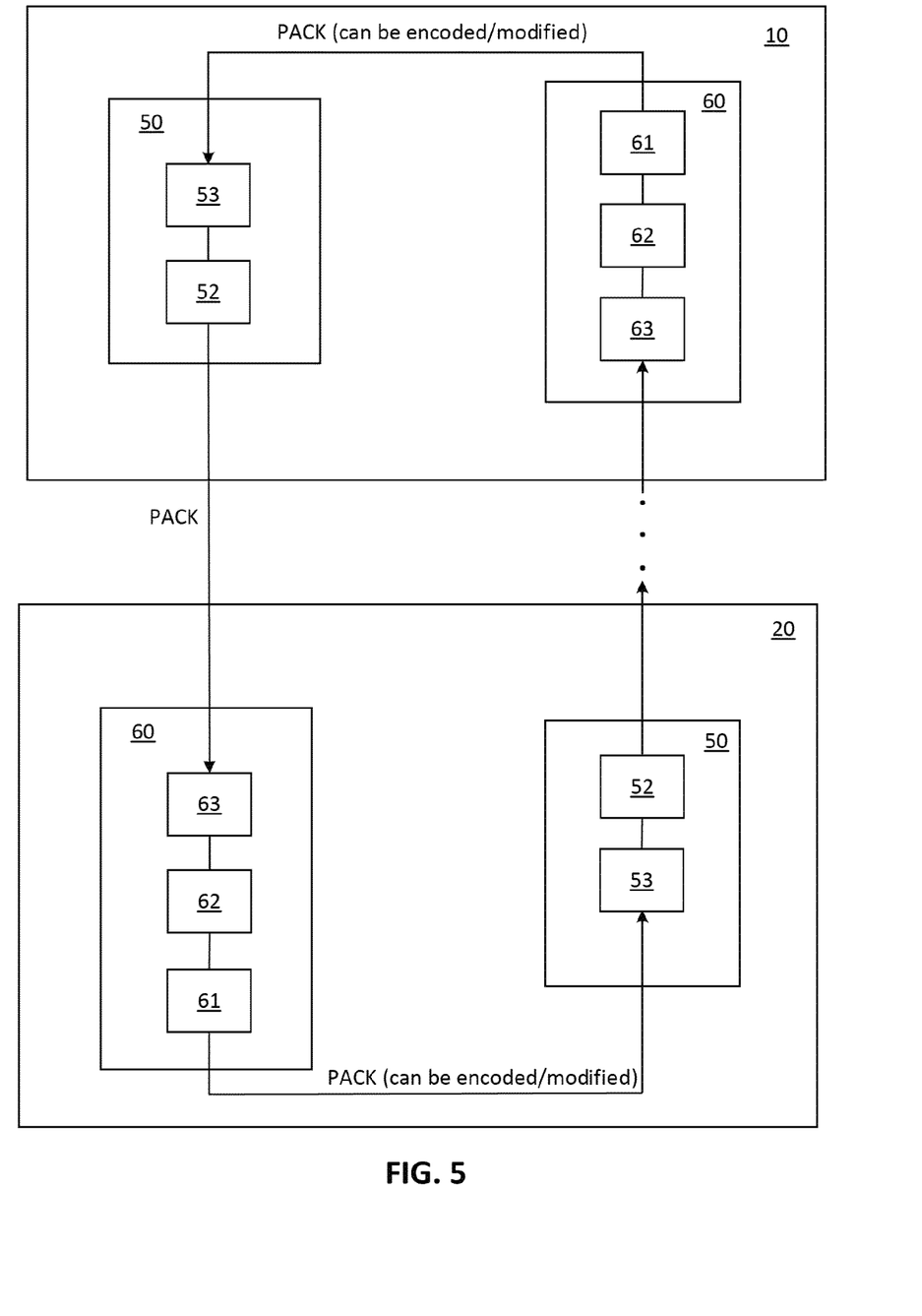
FIG. 5 shows first and second ports within a first node 10 and a second node 20.

In FIG. 5, nodes 10 and 20 are shown, each having a first port 50 and a second port 60. Shown within the first port is framer 52, and input 53, and within the second port is encoder 61, frame buffer 62, and decoder 63. Port 50 includes framer 52 to generate frames including a preemptive acknowledge field (PACK) which is configured to be modified by a receiving port, e.g., port 60 of a second node 20.

Figure 6A:
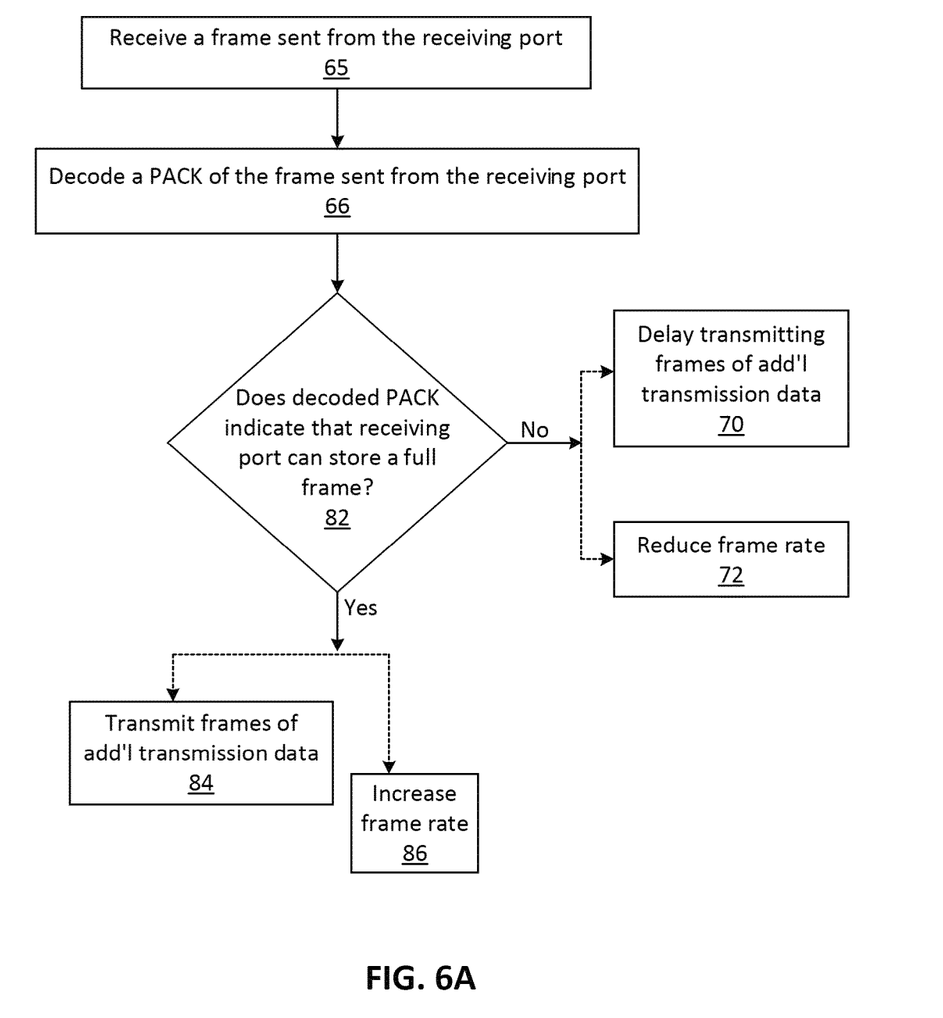
FIG. 6A shows decision logic within the first communication port for either transmitting/not transmitting additional transmission data or increasing/decreasing the frame rate depending on the decoded preemptive acknowledge field.
Figure 6B:
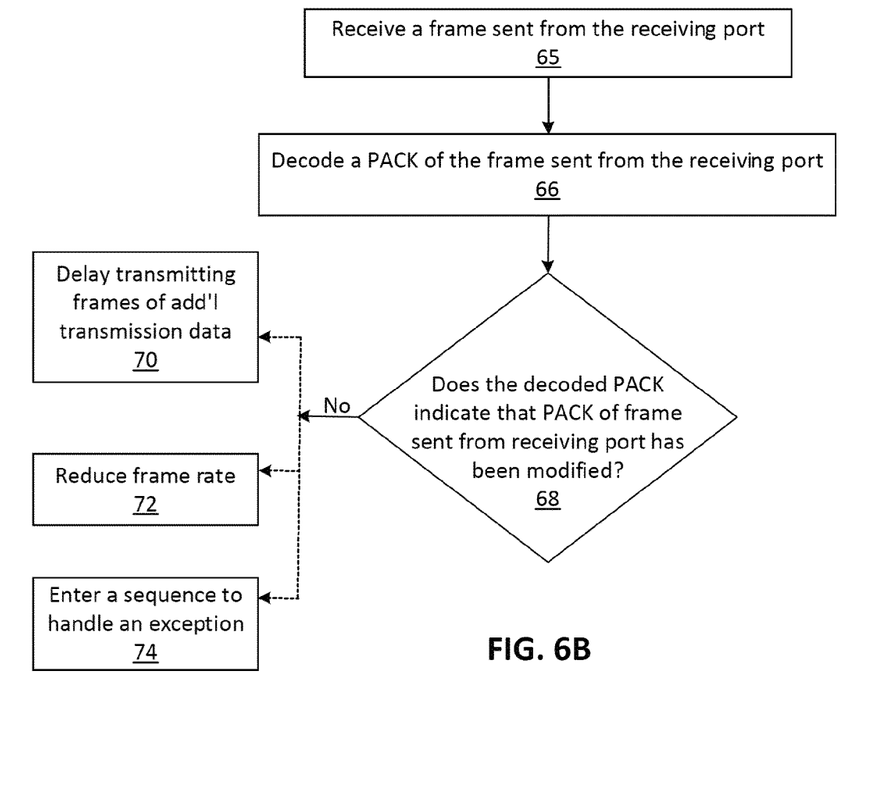
FIG. 6B shows decision logic within the first communication port for either delaying transmitting frames of additional transmission data or reducing the frame rate or entering a sequence to handle an exception depending on the decoded preemptive acknowledge field.
Figure 6C:
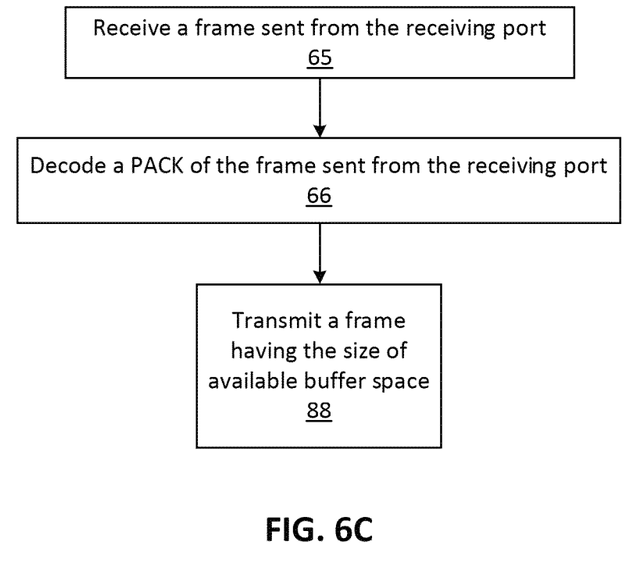
FIG. 6C shows decision logic within the first communication port for transmitting a frame having the size of available buffer space.

FIGS. 6A-C illustrate that after a communication port, such as port 50 in node 10 (FIG. 5), receives a frame and possibly modified preemptive acknowledge field ("PACK") sent from a receiving port, such as port 60 in node 20 (FIG. 5) (step 65). Port 50 then decodes said possibly modified preemptive acknowledge field ("PACK") (step 66). Port 50 then has the option of performing various transmit functions. For example, FIG. 6C illustrates that port 50 can transmit a frame having the size of an available buffer space on the receiving port (step 88). Alternatively as shown in FIG. 6B, port 50 can determine if the PACK has been modified (step 68). If the PACK has not been modified, then transmitting frames of additional transmission data can be delayed (step 70), or the frame rate can be reduced (step 72), or a sequence can be entered to handle an exception (step 74). Steps 70, 72, and 74 correspond to steps which may be performed in alternative embodiments of the invention. Accordingly, the lines extending toward steps 70, 72, and 74 are drawn with dotted lines to indicate the optional performance of one of the alternative embodiments shown. Alternatively as shown in FIG. 6A, a determination can be made (decision block 82) as to the status of the frame buffer (e.g., buffer 62, FIG. 5). If the frame buffer can store a full frame (yes branch of block 82), port 50 can transmit frames of additional transmission data (step 84), or increase the frame rate (step 86). If the frame buffer cannot store a full frame (no branch of block 82), then transmitting frames of additional transmission data can be delayed (step 70) or the frame rate can be reduced (step 72). Again, steps 70 and 72 correspond to steps which may be performed in alternative embodiments of the invention. Accordingly, the lines extending toward steps 70 and 72 are drawn with dotted lines to indicate the optional performance of one of the alternative embodiments shown.

It will be appreciated to those skilled in the art having the benefit of this disclosure that this invention is believed to provide communication ports, nodes, systems, and methods for reducing latency and overhead in communication systems. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed:

1. A communication port within a first node of a closed loop ring network of nodes, the communication port comprising:
a framer configured to generate frames having at least:
a start identifier for marking a beginning of a frame;
a destination address field to identify a receiving port within a second node of the closed loop ring network;
a preemptive acknowledge field which is configured to be encoded by the receiving port of said second node; and
a data field comprising transmission data, wherein said preemptive acknowledge field is positioned in front of said data field;
an input coupled for receiving a frame sent from said second node, wherein the frame sent from said second node comprises an encoded preemptive acknowledge field, which is used to give information to said communication port within said first node about a frame buffer receiving the frames within said second node.

2. The communication port of claim 1, wherein the first node further comprises a decoder for decoding the encoded preemptive acknowledge field included within the frame sent from the second node, and wherein the communication port is configured for proceeding with or ceasing sending additional transmission data to the receiving port dependent upon the decoded preemptive acknowledge field.

3. The communication port of claim 2, wherein the communication port is configured for transmitting frames of the additional transmission data upon determining, from the decoded preemptive acknowledge field, that the frame buffer of said receiving port can store a full frame.

4. The communication port of claim 2, wherein the communication port is configured for delaying transmission of frames of the additional transmission data upon determining, from the decoded preemptive acknowledge field, that the frame buffer of said receiving port cannot store a full a frame.

5. The communication port of claim 2, wherein the communication port is configured for delaying transmission of frames of the additional transmission data upon determining, from the decoded preemptive acknowledge field, that the preemptive acknowledge field of the frame sent to receiving port has not been modified by the receiving port.

6. The communication port of claim 2, wherein the communication port is configured for increasing the frame rate upon determining, from the decoded preemptive acknowledge field, that the frame buffer of said receiving port can store a full a frame.

7. The communication port of claim 2, wherein the communication port is configured for reducing the frame rate upon determining, from the decoded preemptive acknowledge field, that the frame buffer of said receiving port cannot store a full a frame.

8. The first communication port of claim 2, wherein the communication port is configured for reducing the frame rate upon determining, from the decoded preemptive acknowledge field, that the preemptive acknowledge field of the frame sent to receiving port has not been modified by the receiving port.

9. The communication port of claim 2, wherein the communication port is configured for entering a sequence to handle an exception upon determining, from the decoded preemptive acknowledge field, that the preemptive acknowledge field of the frame sent to receiving port has not been modified by the receiving port.

10. The communication port of claim 2, wherein the communication port is further configured for transmitting a frame having the size of an available buffer space on the receiving port.

11. A communication port within a first node of a closed loop ring network of nodes, the communication port comprising:
a frame buffer for storing frames; and
an encoder for encoding information in a preemptive acknowledge field of a frame about the status of the frame buffer, wherein the encoder is configured to modify a preemptive acknowledge field of a frame received from a second node of the closed loop ring network depending on space availability of the frame buffer, and wherein the encoder is configured for encoding information in the preemptive acknowledge field indicating that said frame buffer can store a full frame or said frame buffer cannot store a full frame, and wherein the first node further comprises another communication port, which is configured to generate a new frame depending on the encoded information in the preemptive acknowledge field.

12. The communication port of claim 11, wherein the encoded information in the preemptive acknowledge field causes the other communication port to generate the new frame absent a data field.

13. The communication port of claim 11, wherein the encoder is configured to encode a delay time in said preemptive acknowledge field.

14. A closed loop ring communication system, comprising:
a first node configured to generate frames having at least:
a start identifier for marking a beginning of a frame;
a destination address field to identify a receiving port of another node;
a preemptive acknowledge field which is configured to be encoded by the receiving port; and
a data field comprising transmission data, wherein said preemptive acknowledge field is positioned in front of said data field; and
a second node communicatively coupled to the first node, wherein a receiving port of the second node comprises:
a frame buffer for storing frames; and
an encoder for encoding information in the preemptive acknowledge field of a frame received from the first node about the status of the frame buffer within the second node.

15. The communication system of claim 14, wherein the first node is further configured for:
receiving a frame sent from the second node;
decoding the preemptive acknowledge field of the frame sent from the second node; and
proceeding with or ceasing sending additional transmission data to the second communication port dependent upon the decoded preemptive acknowledge field of the frame sent from the second node.

16. The communication system of claim 14, wherein the encoder included within the receiving port of the second node is configured to modify the preemptive acknowledge field of the frame received from the first node.

17. The communication system of claim 14, wherein the second node is configured to generate a new frame having a preemptive acknowledge field different from the preemptive acknowledge field of the frame received from the first node.

18. A bus node within a ring network of nodes, comprising:
a first communication port configured to generate frames having at least:
a start identifier for marking a beginning of a frame;
a destination address field to identify a receiving port;
a preemptive acknowledge field which is configured to be encoded by the receiving port; and
a data field comprising transmission data, wherein said preemptive acknowledge field is positioned in front of said data field; and
a second communication port communicatively coupled to the first communication port, wherein the second communication port comprises:
a frame buffer for storing frames; and
an encoder for modifying a preemptive acknowledge field of a frame received from another node of the ring network dependent upon a status of the frame buffer.

19. The bus node of claim 18, wherein the second communication port is further configured for:
receiving the frame sent from the other node of the ring network;
decoding the preemptive acknowledge field of the frame received from the other node of the ring network; and
proceeding with or ceasing sending additional transmission data to the other node dependent upon the decoded preemptive acknowledge field.

20. A method for communication between a first port and a second port in a communication system, comprising:
generating in a first port a frame having at least:
a destination address field to identify one or more receiving ports;
a preemptive acknowledge field which is configured to be encoded by the one or more receiving ports; and
a data field comprising transmission data, wherein said preemptive acknowledge field is positioned in front of said data field;
transmitting the frame via a transmission line to the one or more receiving ports;
evaluating in succession at ports along the transmission line the destination address field and determining whether the frame is to be received at the respective ports; and
evaluating space availability of a frame buffer associated with a receiving port and modifying the preemptive acknowledge field of the frame received over the transmission line from the first port depending on the space availability of the frame buffer within the receiving port.

21. The method of claim 20, further comprising:
encoding, at the receiving port, information in said preemptive acknowledge field of the frame received from the first port, wherein said information includes a space availability of the frame buffer;
forwarding the frame with the preemptive acknowledge field encoded with said information to the first port;
decoding, at the first port, said encoded preemptive acknowledge field including said information; and
proceeding with or ceasing sending additional transmission data from the first port to the one or more receiving ports dependent upon said decoded preemptive acknowledge field including said information.

22. The method of claim 21, wherein the step of encoding the information in said preemptive acknowledge field comprises encoding information indicative that said frame buffer can store a full frame or said frame buffer cannot store a full frame.

23. The method of claim 20, further comprising:
generating, at the receiving port, a new frame having a preemptive acknowledge field comprising information, wherein said information includes a space availability of the frame buffer;
forwarding the new frame to the first port;
decoding, at the first port, said encoded preemptive acknowledge field including said information; and
proceeding with or ceasing sending additional transmission data from the first port to the one or more receiving ports dependent upon said decoded preemptive acknowledge field including said information.

24. The method of claim 20, further comprising:
forwarding the preemptive acknowledge field of the frame unmodified to the first port upon evaluating that the frame buffer of the receiving port is full or has at least reached a certain limit;
determining, at the first port, that the preemptive acknowledge field of the frame is unmodified; and
ceasing sending additional transmission data from the first port to the one or more receiving ports.

* * * * *